United States Patent Office 3,329,672
Patented July 4, 1967

3,329,672
CARBONYL-CONTAINING STARCH DERIVATIVES AND PROCESS FOR MAKING SAME
Hugh J. Roberts, La Grange, Ill., assignor to Corn Products Company, New York, N.Y., a corporation of Delaware
No Drawing. Filed Aug. 12, 1963, Ser. No. 301,605
14 Claims. (Cl. 260—233.3)

This invention relates to novel starch derivatives containing a plurality of highly reactive carbonyl groups, and to methods for their preparation. More particularly it relates to starch ethers characterized by the presence of an aldehyde or ketone function in the substituent ether group, and to the preparation of such aldehyde or ketone ethers of starch by a method which comprises the oxidation of vic-dihydroxyalkyl ethers of starch.

By "vic-dihydroxyalkyl" I mean a dihydroxyalkyl radical in which the two hydroxyl groups are attached to vicinal, or adjacent, carbon atoms. For convenience, I shall use the term "vic-glycol group" to designate a carbon-carbon group, each carbon atom of which carries a hydroxyl group

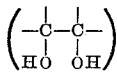

Carbonyl groups have been introduced into starch in the past. In fact, it is generally accepted that native starches already contain at least one aldehyde group at the reducing end of each molecule. Due to the extremely high molecular weight of native starches, however, their aldehyde content on a weight basis is vanishingly small. The number of aldehyde groups in starch may be increased by hydrolysis of the glucosidic bonds; but each time the aldehyde content is doubled by hydrolysis, the average molecular weight is halved.

Aldehyde groups have been introduced into starch without significant lowering of the molecular weight by periodate oxidation (E. L. Jackson and C. S. Hudson, J. Am. Chem. Soc., 59, 2049 (1937); W. E. C. Yelland, U.S. Patent 2,606,188; Aug. 5, 1952). The mechanism of the periodate oxidation of starch, yielding the compound generally known as "dialdehyde starch," is believed to proceed as follows:

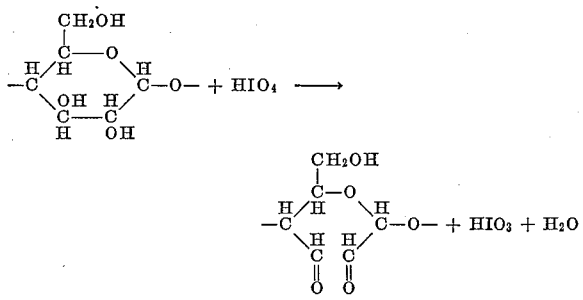

These dialdehyde starches of the prior art have a number of desirable properties; i.e. the reactive aldehyde groups make them excellent starting materials for a number of starch derivatives. In addition, they have good film-forming properties. They do, however, possess the serious disadvantage that they undergo rapid depolymerization in alkaline solutions yielding acidic products. The introduction of aldehyde or ketone groups into starch by the method which I have discovered, that is by the oxidation of vic-dihydroxyalkyl ethers of starch in the manner prescribed by this specification, provides a new class of carbonyl-containing starches that are very much superior to dialdehyde starch in regard to their viscosity stability in alkaline systems.

It is an object of the present invention to prepare novel starch derivatives which contain reactive carbonyl groups, and which are stable in alkaline solution.

It is a further object of the present invention to prepare novel starch derivatives which are eminently useful as adhesives, sizes for textiles and paper, and tanning agents.

A further object is the preparation of starch derivatives which will react to insolubilize films and fibers of other polymeric materials, such as soluble polysaccharides (e.g. starch propionamide), soluble proteins, synthetic polyamides, poly(vinyl alcohol), or the like.

Another object is to prepare additional novel starch derivatives by reacting my new carbonyl-containing starch derivatives with carbonyl-reactive compounds, e.g. sodium bisulfite, or such nitrogen-containing compounds as urea, hydroxylamine, melamine and derivatives of melamine such as N,N-diallylmelamine, etc.

Other objects and advantages will appear hereinafter.

The novel starch derivatives of my invention are preferably starch ethers, the substituent radicals of which contain carbonyl groups.

The following formula is a typical example of my derivatives:

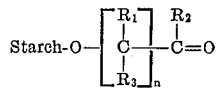

wherein $R_1$, $R_2$ and $R_3$ are taken from the group consisting of hydrogen, alkyl, cycloalkyl, substituted alkyl, alkenyl, aralkyl or aryl groups, and $n$ is 1 or greater. If $R_2$ is hydrogen, the derivative is, of course, an aldehyde ether; if $R_2$ is other than hydrogen, the product is a keto ether.

The derivatives may be prepared by oxidizing a starch ether or other derivative, the substituent radical of which contains at least two hydroxyl groups on adjacent carbon atoms, with a suitable oxidizing agent; namely, one which is capable of dehydrogenating and cleaving the vic-glycol group to yield a starch derivative wherein the substituent radical contains a carbonyl group. The following is a typical reaction, in which sodium meta periodate is used as the oxidizing agent:

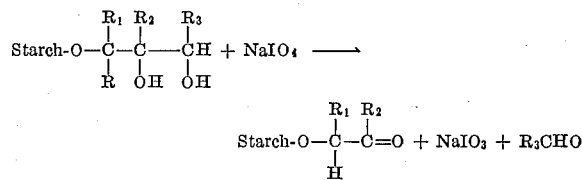

$R_1$, $R_2$ and $R_3$ are taken from the same group as $R_1$, $R_2$ and $R_3$ in the preceding formula.

As can be seen from the above equation, the oxidizing agent breaks the covalent bond between the adjacent hydroxyl-bearing carbon atoms, and oxidizes the hydroxyl groups to carbonyls. Not all oxidizing agents will do this; therefore the choice of oxidizing agent is of vital importance. The following are suitable oxidizing agents, which will perform the necessary cleavage of a vic-glycol group, coupled with oxidation or dehydrogenation of the hydroxyl groups to carbonyls: compounds yielding periodate ions in solution, such as periodic acid, sodium meta periodate, potassium meta periodate, or the like; lead tetraacetate, or similarly, red lead (lead tetraoxide) in the presence of acetic acid; iodosobenzene. It is not fully understood just what chemical characteristics of the aforementioned compounds make them capable of cleaving a vic-glycol group, and dehydrogenating or oxidizing the hydroxyls to form carbonyl groups. It is, therefore, impossible at this stage of the art to predict what, if any, other compounds may be capable of performing the same function.

Any starch derivative may be used as the starting material for my invention provided it has the following structural characteristics:

(1) The substituent radical must contain at least three carbon atoms in a linear chain;

(2) At least two adjacent carbon atoms of the substituent radical must contain hydroxyl groups.

Preferably, in order to avoid the possibility of steric hindrance, the hydroxyl groups are contained on the terminal and adjacent to the terminal carbon atoms, although this is not absolutely necessary in all cases.

The linkage between the starch and the substituent radical is not critical and may consist of, e.g. an ether, ester, glycosidic, or direct carbon-carbon linkage. Because of their relative economy and simplicity of preparation, I prefer to practice the invention using starch ethers, but those skilled in the art will readily perceive that other derivatives may also be used.

The starting materials for my invention, i.e. the starch derivatives the substituent radicals of which contain vic-glycol groups, may be prepared by reacting starch with a 2,3-epoxyalcohol having the formula:

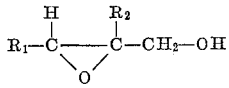

wherein $R_1$ and $R_2$ are taken from the group consisting of hydrogen, alkyl, substituted alkyl, cycloalkyl, alkenyl, aryl and aralkyl; or by reacting starch with a halohydrin having the formula:

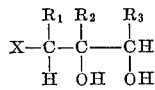

wherein $R_1$ and $R_2$ and $R_3$ are taken from the same group as $R_1$ and $R_2$ in the preceding formula, and X is a halogen.

The following equations illustrate generally my invention: 2,3-dihydroxypropyl starch is first prepared, as by reacting starch with either glycerol alpha-monochlorohydrin (Equation 1) or glycidol (2,3-epoxypropanol) (Equation 2) in the presence of aqueous alkali:

(1) Starch—OH+ClCH$_2$—CHOH—CH$_2$OH+NaOH

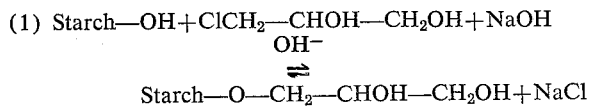

or

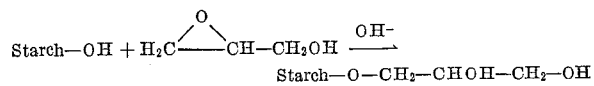

The 2,3-dihydroxypropyl starch is then oxidized with periodate ions, or other suitable oxidizing agent, as follows:

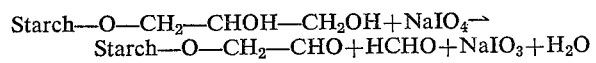

Several other starch derivatives which are suitable as starting materials for the preparation of my carbonyl-containing derivatives, as well as specific methods for their preparation, are described in copending application U.S. Ser. No. 232,864, filed Oct. 24, 1962.

The molar ratio of oxidizing agent to vic-glycol groups is not critical. However, I ordinarily use a mole ratio of about 0.9–1.0 for the following reasons:

(a) As the molar ratio decreases below 1.0, fewer of the vic-glycol groups are oxidized, resulting in a product having a smaller content of carbonyl groups; in some instances, however, this smaller carbonyl content may be desirable.

(b) As the mole ratio increases above 1.0, all of the oxidizing agent is not utilized in the oxidation and the economics of the invention is adversely affected. Furthermore, at the higher mole ratios the reaction time must be kept extremely short to prevent a reduction in alkali-stability resulting from oxidation of the starch molecule itself at the 2–3 position; at mole ratios less than 1.0 all of the oxidizing agent is rapidly consumed, whereupon the reaction ceases automatically.

No catalyst is required in the reaction, and the pH is not critical with one exception; when using lead tetraacetate or red lead in the presence of acetic acid, the pH must be on the acid side—otherwise the lead will be precipitated out of solution. Although not necessary, a pH of 8 or below is more practical when using periodate compounds as oxidizing agents, because periodate compounds are less water soluble at alkaline pH's.

The reaction will take place at room temperature (about 25° C.) or below, although heat may be applied. However, at higher temperatures (e.g. about 80° C.) the oxidizing agent attacks not only the vic-glycol group of the substituent radical but the $C_2$–$C_3$ bond of the anhydroglucose units of the starch molecule itself, thereby resulting in my carbonyl-containing starch derivative possessing some oxidized anhydroglucose groups characteristic of dialdehyde starch. Therefore, when a pure carbonyl-containing starch derivative is desired, the reaction temperature is preferably between about 0° C. and about 25° C.

There is no critical degree of substitution. The lower limit of degree of substitution is fixed only by the sensitivity of the method of measurement, and the upper limit by the number of vic-glycol groups which can be introduced into starch.

Any type of starch can be used in my invention; e.g. corn (maize), potato, wheat, tapioca, rice, sorghum, waxy starches, high amylose starch, or the like. Starch fractions, i.e. amylose or amylopectin, can also be used. Also, various modified starches, such as acid modified, enzyme modified, or hypochlorite modified starches are effective for the invention. The starch may be either gelatinized or in granule form. Derivatized starches, (i.e. starches already containing substituent radicals), so long as they retain some hydroxyl groups capable of reacting with the derivatizing agent, may also be used. All that is required of the initial starch is that it retain some reactive hydroxyl groups on the molecule, so as to be capable of forming a vic-glycol derivative having the required structural characteristics specified above. In addition to starch other polysaccharides such as cellulose, hemicellulose, or derivatives thereof, could be used in the practice of the invention.

The products of my invention have a large number of uses. By themselves, they are excellent adhesives, sizes for textiles and paper, and tanning agents. Upon curing at an acid pH, they form water-insoluble films. They will insolubilize films of starch propionamide or starch carbamate, presumably by reaction between the aldehyde and amide groups. They will also insolubilize films and fibers of soluble proteins, synthetic polyamides, poly (vinyl alcohol), and soluble polysaccharides. Because of the highly reactive carbonyl group they can be used as intermediates in the preparation of many other starch derivatives, which derivatives are also useful as adhesives and sizing agents, and thickening agents for paints.

In physical appearance the products of my invention are fine, white powders, resembling starch.

The following examples will illustrate more fully my invention, and the uses thereof. They are given for illustrative purposes only, and are not intended to limit the invention in any way.

EXAMPLE 1

*Preparation of starch glycolaldehyde ether*

One-eighth mole (25 grams) of 2,3-dihydroxypropyl starch, in granule form, having a degree of substitution of 0.2 and containing 88.6 percent dry substance (approximately 0.03 mole of dihydroxypropyl groups) was pasted in 400 ml. of water by heating at 95°–100° C. for 10 minutes. The paste was washed into a 2-liter amber glass jar with water to make 1000 ml., and chilled at 0°–1° C.; 100 ml. of 5.35 percent sodium periodate (0.025 mole) was added dropwise from a buret over a period of 135 minutes, with constant mixing. The resultant paste was stirred for an additional hour at 0°–1° C., then held overnight in a refrigerator. The paste was then poured into 1100 ml. of acetone with stirring. The gelatinous precipitate was separated from the aqueous acetone by decantation, and extracted in a blender with two 600-ml. portions of 50 percent acetone and a final 600 ml. portion of acetone. Each extraction was followed by suction filtration. The product, starch glycolaldehyde ether, was dried at 90°–100° for a few hours. It contained 0.17

—OCH$_2$CHO group per anhydroglucose unit.

EXAMPLE 2

This example illustrates the improved alkali-stability of the derivatives of the invention over conventional dialdehyde starch. A 2,3-dihydroxypropyl starch ether, having a degree of substitution of 0.2, was oxidized with 0.2 mole of sodium periodate per mole as described in Example 1. The viscosity in alkali of the oxidation product, the glycolaldehyde ether of starch, was compared with that of a dialdehyde starch prepared by the oxidation of corn starch with 0.2 mole of sodium periodate per mole in an identical manner. Ten ml. of 15 percent paste at 50° C. was transferred to an Ostwald-Cannon-Fenske pipet and diluted with 5 ml. of 0.15 N sodium hydroxide, also at 50° C., to give a final alkali concentration of 0.10 N and a starch derivative concentration of 10 percent. The flow time was measured at intervals, and the viscosity number was calculated therefrom. The viscosity of the alkaline paste of the starch glycolaldehyde ether remained constant while that of the alkaline dialdehyde starch paste steadily decreased.

EXAMPLE 3

Starch glycolaldehyde ether and dialdehyde starch were prepared as described in Example 2. The rates of formation of acid in alkaline pastes of these two aldehyde starches were compared. The dialdehyde starch produced seven times as much acid as did the starch glycolaldehyde ether in a period of one hour, indicating that the dialdehyde starch had undergone far more depolymerization than had the product of the invention.

EXAMPLE 4

*Preparation of starch glyceraldehyde ether*

To a slurry of 92 grams of 1-hydroxymethyl-2,3-dihydroxypropyl starch in granule form

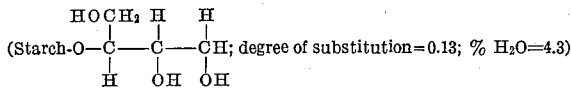

(Starch-O—C—C—CH; degree of substitution=0.13; % H$_2$O=4.3)

in 183 ml. of water maintained at 0–2° C. was added 430 ml. of a 3.06 percent solution of sodium periodate (NaIO$_4$) at a rate of 4 ml. per minute. The slurry was allowed to stand overnight at 4° C. before filtration. The filter cake was washed free from iodate with water and dried. The product was a fine white powder which contained 0.06 aldehyde group per anhydroglucose unit.

EXAMPLE 5

*Preparation of starch lactaldehyde ether*

A slurry of 50 grams of 1-methyl-2,3-dihydroxypropyl starch in granule form

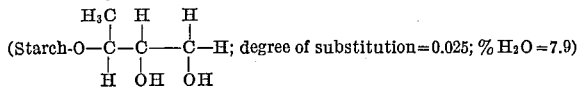

(Starch-O—C—C—C—H; degree of substitution=0.025; % H$_2$O=7.9)

in 100 ml. of water was treated with 43 ml. of 3.06 percent sodium periodate solution as described in Example 4. The product contained 0.02 aldehyde group per anhydroglucose unit.

EXAMPLE 6

*Preparation of starch hydroxyacetone ether*

A slurry of 43.5 grams of 2-methyl-2,3-dihydroxypropyl starch

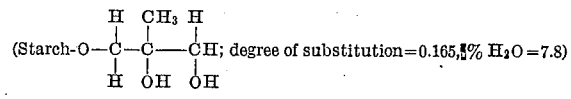

(Starch-O—C—C—CH; degree of substitution=0.165, % H$_2$O=7.8)

in 287 ml. of water was treated with 232 ml. of 3.06 percent sodium periodate as described in Example 4. The product contained 0.11 ketone group per anhydroglucose unit.

EXAMPLE 7

*Preparation of starch glycolaldehyde ether*

One hundred grams of 2,3-dihydroxypropyl starch (D.S.=0.39, % H$_2$O=11.0) was dissolved in a liter of water and heated to 90–100° C. for 10 minutes. The clear, colorless paste was cooled to 0° C. and a solution of 34.7 grams of sodium periodate in 566 ml. of water was added. The paste immediately set to a gel. After 1 hour, the gel was melted by heating to 40° C. The resulting solution was allowed to stand at room temperature for 30 minutes before it was added to 5.2 liters of ethanol in a blender. The precipitate was washed with a 1:1 acetone-water mixture until free from iodate. The dried product contained 0.30 aldehyde group per anhydroglucose unit.

EXAMPLE 8

*Preparation of starch glycolaldehyde ether by oxidation of 2,3-dihydroxypropyl starch with periodic acid*

To 50 grams of 2,3-dihydroxypropyl starch in granule form (D.S.=0.10, percent H$_2$O=11.5) slurried in 100 ml. of water at 1° C. was added 170 ml. of a 3.25 percent solution of periodic acid (HIO$_4$) at a rate of 4 ml. per minute. The slurry was allowed to stand overnight at 4° C. and filtered. The filter cake was washed free from iodate, and air-dried. The product contained 0.085 aldehyde group per anhydroglucose unit.

EXAMPLE 9

*Preparation of starch glycolaldehyde ether by oxidation of 2,3-dihydroxypropyl starch with potassium periodate*

To 50 grams of 2,3-dihydroxypropyl starch in granule form (D.S.=0.18, percent H$_2$O=12.2) slurried in 410 ml. of water at 1° C. was added 16.4 grams of potassium periodate (KIO$_4$). The reaction mixture was stirred at 1° C. overnight. The slurry was filtered and the filter cake was washed free from iodate and air dried. Analysis showed that 97 percent of the α-glycol groups had been oxidized to aldehyde groups.

EXAMPLE 10

*Preparation of starch glycolaldehyde ether by oxidation of 2,3-dihydroxypropyl starch with lead tetraacetate formed in situ*

To 50 grams of 2,3-dihydroxypropyl starch in granule form (D.S.=0.105, percent H$_2$O=12.2) in 150 ml. of glacial acetic acid was added 20.6 grams of red lead (Pb$_3$O$_4$). Agitation was continued for 22 hours at room temperature (25° C.). The slurry was filtered, the filter cake reslurried in water and neutralized to pH 7 with aqueous sodium hydroxide. After filtration the product was washed on the filter with 500 ml. of water, then air-dried. It contained 0.03 aldehyde group per anhydroglucose unit.

EXAMPLE 11

*Preparation of starch glycolaldehyde ether at 80° C.*

The following example illustrates the fact that at higher reaction temperatures an appreciable number of the anhydroglucose units of the starch molecule are oxidized, resulting in the structure characteristic of dialdehyde starch.

A slurry of 50 g. of 2,3-dihydroxypropyl starch (Deg. Sub.=0.14; percent $H_2O$=1.1) in 1200 ml. of water was heated at 80° for 15 minutes to gelatinize the starch. To this paste was slowly added 100 ml. of 3.83 percent sodium periodate. The mixture was held at 80° C. for 45 minutes, cooled, and mixed with 2500 ml. of methanol to precipitate the product. The product was purified by re-precipitation by methanol from a water solution, and dehydration with ethanol. The air dried product contained 0.034 glycolaldeyhde ether group and 0.020 oxidized glucose residues per anhydroglucose unit.

EXAMPLE 12

*Insolubilization of starch glycolaldehyde films by acid*

Pastes of starch glycolaldehyde ether were prepared by heating the ether in water at 90–100° C. for 10 minutes. The pastes were cooled and the pH of one was adjusted with HCl. The pastes were spread on silicone-treated stainless steel plates in films 0.020 inch (0.051 cm.) thick, and the films were dried at 80° C. for 1 hour. The dried films were ground and extracted with water at 50° C. for 1 hour, and their solubility was determined by evaporating a portion of the clear aqueous extract to dryness and weighing the residue. The results (Table I) show that the carbonyl-containing derivative is made water-resistant by a mild acid cure.

TABLE I

| Deg. of Sub. of Starch Glycolaldehyde Ether | Percent Solids in Paste | pH of Paste | Percent Solubles in Cured Film |
| --- | --- | --- | --- |
| 0.12 | 5.0 | [1] 4–5 | 100 |
| 0.08 | 8.3 | [2] 3.1 | 17.5 |

[1] The pH was not adjusted; this is the normal pH range for a starch glycolaldehyde ether paste.
[2] The pH was adjusted with 0.1 N hydrochloric acid.

EXAMPLE 13

*Insolubilization of starch propionamide film*

Films were prepared by casting pastes of starch glycolaldehyde ether, starch propionamide, and mixtures of the two, and subsequently curing (drying) the cast paste. The films were examined for solubility as in Example 12. The results, which are tabulated in Table II, show that the carbonyl-containing starch ether reacts with starch propionamide under the test conditions to markedly reduce the solubility of the latter.

TABLE II

| Paste composition: [1] | Percent solubles in cured film |
| --- | --- |
| 15% starch propionamide, D.S.=0.25 | 95.3 |
| 7.5% starch propionamide, D.S.=0.25; 7.5% starch glycolaldehyde ether, D.S.=0.2 | 17.5 |
| 7.5% starch glycolaldehyde ether, D.S.=0.2 | 85.0 |

[1] All pastes prepared in water and adjusted to pH 9.0.

EXAMPLE 14

*Gelation of protein solutions*

Aqueous pastes were prepared to contain (A) 5 percent starch glycolaldehyde ether, 0.12 D.S., and 5 percent of a water-soluble commercial animal protein (Swift's Paper Makers' Protein Colloid 5V), pH 6.0; (B) 5 percent starch glycolaldehyde, 0.12 D.S., 5 percent of the same protein, and sufficient sodium hydroxide to adjust the pH to 7.4; (C) 5 percent starch glycolaldehyde ether, 5 percent casein, and sufficient sodium hydroxide to adjust the pH to 8.8; and (D) 5 percent unmodified corn starch, 5 percent commercial animal protein (same protein as used in A and B), and sufficient sodium hydroxide to adjust the pH to 8.8. The viscosities of these four pastes were measured at room temperature over a period of time using a Brookfield Viscometer, spindle number 4, at 6 r.p.m. The results (Table III) show that a rapid gelation occurs due to a reaction between the protein and the carbonyl-containing starch ether. The carbonyl-containing starch ethers are therefore useful in hardening photographic gelatinous layers.

TABLE III

| Sample | Paste Components | pH | Viscosity in Centipoises After— | | | |
| --- | --- | --- | --- | --- | --- | --- |
| | | | 2 min. | 30 min. | 60 min. | 180 min. |
| A | Starch Glycolaldehyde Ether plus Animal Protein. | 6.0 | 4,600 | 10,000 | 32,000 | 60,000 |
| B | do | 7.4 | 9,500 | 35,000 | 37,000 | |
| C | Starch Glycolaldehyde Ether plus Casein. | 8.8 | Gel was too stiff to measure | | | |
| D | Unmodified Starch plus Animal Protein. | 8.8 | 2,200 | 2,200 | 2,300 | |

Examples 15–18 illustrate the use of the carbonyl groups on the starch derivatives of this invention as sites for further chemical reaction, thereby producing other new and useful compounds. For example, the products of Examples 15–18 are excellent paper additives for increasing wet and dry strength; the reaction product of starch hydroxyacetone ether with hydroxylamine (Example 16) is suitable as a protective colloid in photographic emulsions.

EXAMPLE 15

*Reaction of starch glycolaldehyde ether with sodium bisulfite*

To a slurry of 50 grams of starch glycolaldehyde ether (D.S.=0.14, 8.1% $H_2O$) in 250 ml. of methanol, 60 ml. of a 4.0 percent aqueous solution of sodium bisulfite was added over a period of 15 minutes. The slurry was heated under reflux at 50° C. while stirring for 30 minutes, cooled and filtered. The filter cake was washed with aqueous methanol until the washings contained no bisulfite. The dried product contained 1.33 percent sulfur, showing that reaction had taken place.

EXAMPLE 16

*Reaction of starch hydroxyacetone ether with hydroxylamine*

Ten grams of starch hydroxyacetone ether (0.17 D.S., 6.0% $H_2O$) was suspended in 100 ml. 0.5 M hydroxylamine hydrochloride solution previously adjusted to pH 5.0. After standing overnight at room temperature with occasional agitation, the slurry was poured into 400 ml. of methanol. The resulting suspension was filtered and the filter cake washed with 80 percent methanol until the washings contained no chloride. The dried product contained 0.91 percent nitrogen, indicating that reaction had occurred between the ether and the hydroxylamine.

EXAMPLE 17

*Reaction of starch glycolaldehyde ether with urea*

A suspension of 27.2 grams of starch glycolaldehyde ether (0.14 D.S., 8.1% $H_2O$) and 1.24 grams of urea in 500 ml. of 80 percent methanol was heated under reflux at 50° C. for 1 hour. The suspension was filtered and the filter cake washed successively with 1000 ml. of water, 500 ml. of 50 percent methanol and 200 ml. of ethanol. The dried product contained 0.11 percent nitrogen.

EXAMPLE 18

*Reaction of starch glycolaldehyde ether with N,N-diallylmelamine*

To a solution of 3.12 grams N,N-diallylmelamine in 100 ml. of methanol and 20 ml. of water was added 20 grams of starch glycolaldehyde ether (0.14 D.S., 8.1% $H_2O$) and 2.0 ml. of 8 N sulfuric acid. The mixture was heated under reflux at 50° C. for 4 hours, then filtered. The filter cake was washed thoroughly with water and with methanol. The dried product contained 0.59 percent nitrogen.

I claim:

1. As a new composition of matter a starch derivative having a degree of substitution of a small but detectable amount up to 3.0, the substituent group of said derivative comprising an uninterrupted carbon chain containing at least 2 carbon atoms, said carbon chain including a radical selected from the group consisting of aldehydes and ketones, at least one carbon atom being positioned between said radical and the starch molecule.

2. The composition of matter according to claim 1, wherein said starch derivative is gelatinized.

3. The composition of matter according to claim 1, wherein said starch derivative is in granule form.

4. The composition of matter according to claim 1, wherein said starch derivative is a starch ether.

5. A process of preparing a carbonyl-containing starch derivative which comprises:
   (a) forming a starch derivative, the substituent radical of which contains a vic-glycol group; and
   (b) oxidizing said starch derivative with an oxidizing agent capable of dehydrogenating and cleaving a vic-glycol group;

thereby yielding a starch derivative, the substituent group of said derivative comprising an uninterrupted carbon chain containing at least 2 carbon atoms, said carbon chain including a radical selected from the group consisting of aldehydes and ketones, at least one carbon atom being positioned between said radical and the starch molecule.

6. The process according to claim 5, wherein said oxidizing agent is a compound selected from the group consisting of periodic acid, salts of periodic acid, lead tetraacetate, red lead in the presence of acetic acid, and iodosobenzene.

7. A process of preparing a carbonyl-containing starch derivative which comprises oxidizing a starch derivative, the substituent radical of which contains a vic-glycol group, with an oxidizing agent capable of dehydrogenating and cleaving a vic-glycol group, thereby yielding a starch derivative, the substituent group of said derivative comprising an uninterrupted carbon chain containing at least 2 carbon atoms, said carbon chain including a radical selected from the group consisting of aldehydes and ketones, at least one carbon atom being positioned between said radical and the starch molecule.

8. The process according to claim 7, wherein said oxidizing agent is a compound selected from the group consisting of periodic acid, salts of periodic acid, lead tetraacetate, red lead in the presence of acetic acid, and iodosobenzene.

9. As a new composition of matter, starch glyceraldehyde ether having a degree of substitution of a small but detectable amount up to 3.0.

10. As a new composition of matter, starch lactaldehyde ether having a degree of substitution of a small but detectable amount up to 3.0.

11. As a new composition of matter, starch hydroxyacetone ether having a degree of substitution of a small but detectable amount up to 3.0.

12. As a new composition of matter, starch glycolaldehyde ether having a degree of substitution of a small but detectable amount up to 3.0.

13. As a new composition of matter a starch ether having a degree of substitution of a small but detectable amount up to 3.0, the substituent group of said ether comprising an uninterrupted carbon chain containing at least 2 carbon atoms, said carbon chain including a radical selected from the group consisting of aldehydes and ketones, at least one carbon atom being positioned between said radical and the starch molecule.

14. As a new composition of matter, the reaction product of the starch derivative of claim 1 with a member selected from the group consisting of sodium bisulfite, hydroxylamine, urea, melamine, and derivatives of melamine.

References Cited

UNITED STATES PATENTS 3,098,869   7/1963   Borchert _____ 260—233.3 XR
3,099,573   7/1963   Borchert _____ 260—233.3 XR

OTHER REFERENCES

Pitman, The Carbohydrates, Academic Press, N.Y. (1957), pp. 346–352.

DONALD E. CZAJA, *Primary Examiner.*

LEON J. BERCOVITZ, *Examiner.*

R. W. MULCAHY, *Assistant Examiner.*